United States Patent
Hase et al.

(10) Patent No.: US 9,577,750 B2
(45) Date of Patent: Feb. 21, 2017

(54) MULTIFUNCTIONAL MICRO SENSOR SYSTEM

(71) Applicant: Elmos Semiconductor AG, Dortmund (DE)

(72) Inventors: Michael Hase, Wiesloch (DE); Michael Domokos, Kuernbach (DE); Uwe Hendrik Hill, Remchingen (DE)

(73) Assignee: Elmos Semiconductor AG, Dortmund (DE)

( * ) Notice: Subject to any disclaimer, the term of this patent is extended or adjusted under 35 U.S.C. 154(b) by 0 days.

(21) Appl. No.: 14/770,904

(22) PCT Filed: Feb. 7, 2014

(86) PCT No.: PCT/DE2014/000046
§ 371 (c)(1),
(2) Date: Aug. 27, 2015

(87) PCT Pub. No.: WO2014/131386
PCT Pub. Date: Sep. 4, 2014

(65) Prior Publication Data
US 2016/0006505 A1    Jan. 7, 2016

(30) Foreign Application Priority Data

Feb. 27, 2013 (DE) .......................... 10 2013 003 791
Mar. 28, 2013 (DE) .......................... 10 2013 005 787
Jan. 22, 2014 (WO) ................ PCT/DE2014/000024

(51) Int. Cl.
*H04B 10/00* (2013.01)
*H04B 10/079* (2013.01)
(Continued)

(52) U.S. Cl.
CPC ......... *H04B 10/0795* (2013.01); *G01S 7/4813* (2013.01); *G01S 7/4814* (2013.01);
(Continued)

(58) Field of Classification Search
CPC ......... G01S 17/026; G01S 17/06; H04B 10/40
See application file for complete search history.

(56) References Cited

U.S. PATENT DOCUMENTS

2003/0155487 A1* 8/2003 Reime ..................... G01S 3/783
250/221
2005/0184301 A1   8/2005 Nagasaka et al.
(Continued)

FOREIGN PATENT DOCUMENTS

CN    103154769 A    6/2013
DE    10256429 A1    6/2004
(Continued)

OTHER PUBLICATIONS

International Search Report for PCT/DE2014/000046 dated May 15, 2014 (10 pages; with English translation).

*Primary Examiner* — Daniel Dobson
(74) *Attorney, Agent, or Firm* — Bejin Bieneman PLC

(57) ABSTRACT

A measurement device relates to a Halios system for measuring an optical transmission path, in which at least one receiver and a compensation transmitter are optically separated from each other by an optical barrier in such a matter that a direct irradiation of said receiver by said compensation transmitter is not possible. Said compensation transmitter and a transmitter are of the same type and/or have at least a common electric optical working point in an optical working point. Said optical barrier has a compensation path, characterized by a compensation window, which attenuates the light of the compensation transmitter before it hits the receiver in such a manner that the compensation transmitter and said transmitter are operated at least in an optical working point by a controller in said identical electro-optical working point.

20 Claims, 13 Drawing Sheets

(51) Int. Cl.
*G01S 17/02* (2006.01)
*G01S 7/481* (2006.01)
*G01S 7/497* (2006.01)
*H04J 14/00* (2006.01)

(52) U.S. Cl.
CPC ............ *G01S 7/4816* (2013.01); *G01S 7/497* (2013.01); *G01S 17/026* (2013.01)

(56) References Cited

U.S. PATENT DOCUMENTS

| | | |
|---|---|---|
| 2013/0181613 A1 | 7/2013 | Schweninger |
| 2014/0341567 A1* | 11/2014 | Schweninger ........ G01S 7/4811 398/30 |
| 2016/0077208 A1* | 3/2016 | Hill ........................ G01S 17/36 356/4.01 |

FOREIGN PATENT DOCUMENTS

| | | |
|---|---|---|
| DE | 102006003269 A1 | 7/2007 |
| DE | 102006020570 A1 | 11/2007 |
| DE | 102010014462 A1 | 10/2011 |
| DE | 102010028967 A1 | 10/2011 |
| DE | 102010027499 A1 | 1/2012 |
| DE | 102012102056 A1 | 10/2012 |
| DE | 102012210891 A1 | 1/2013 |
| EP | 2418512 A1 | 2/2012 |
| EP | 2549652 A2 | 1/2013 |
| EP | 2598908 A1 | 6/2013 |
| KR | 20130052741 A | 5/2013 |
| WO | 2012013757 A1 | 2/2012 |
| WO | 2013134456 A1 | 9/2013 |

* cited by examiner

MULTIFUNCTIONAL MICRO SENSOR SYSTEM

CROSS-REFERENCE TO RELATED APPLICATIONS

This application is a national stage of, and claims priority to, Patent Cooperation Treaty Patent Application No. PCT/DE2014/000046, filed on Feb. 7, 2014, which claims priority to German Application No. DE 10 2013 003 791.3, filed Feb. 27, 2013, German Application No. DE 10 2013 005 787.6 28, filed Mar. 28, 2013 and Patent Cooperation Treaty Patent Application No. PCT/DE2014/000024, filed Jan. 22, 2014, each of which applications are hereby incorporated herein by reference in their entireties.

BACKGROUND

For three dimensional gesture recognition, e.g. the recognition of wipe and approximation gestures, sensors are required that are capable to detect the position, the movement and the orientation of hands.

Besides the use of cameras, the use of simple LED and photo diode-based concepts is of special interest due to the related cost.

A significant problem known from the state of the art is the available assembly space. Different methods have been developed to improve the robustness against external light and other disturbances.

State of the art systems are known to have a generator (G) producing a transmitter signal (S5), through which a transmitter (H) is fed. The transmitter (H) transmits into a receiver (D) having passed the transmission path to be measured, which consists of a first partial transmission path (I1) and a second partial transmission path (I2). The receiver output signal (S0) of the receiver (D) is converted to a compensation signal (S3) by a controller (CT), through which a compensation transmitter (K) is fed, which transmits typically in a linear superimposing manner into the third transmission path (I3) as well as into the receiver (D).

Thereby the compensation signal (S3) is generated in such a way by the controller (CT) out of the receiver output signal (S0) and the transmitter signal (S5), that the receiver output signal (S0) contains no remaining components of the transmitter signal (S5), with the exception of system noise and a control error. These types of systems, called HALIOS systems in the following sections, are especially robust towards sources of interference, such as sun light, while simultaneously being robust towards dirt and the drift of a receiver (D). One such HALIOS system is for example known from the DE102010014462A1 or the EP2418512A1.

Overall there are two basic versions known of the HALIOS system from the state of the art, which can for example also be combined by switching between them or by smooth transitions between the different controller properties. Because the first claim refers to Halios systems in general, in following the definition for such state of the art Halios systems is given, to be able to keep the claims short and compact.

A Halios system in the sense of this disclosure is characterized hereby, that i. either in the first version
   a. it possesses at minimum one signal generator (G) able to generate at minimum one transmitter signal (S5), driving at minimum one transmitter (H), that irradiates into at minimum one receiver (D) and
   b. it possesses at minimum one controller (CT), which puts out at minimum one compensation signal (S3), by which at minimum one compensation transmitter (K) is driven, which also transmits in a superimposing manner into the at minimum one of the said receivers (D) and
   c. that the said controller (CT) generates the minimum of one said compensation signal (S3), of at minimum one of the receiver output signals (S0) of said receiver (D), and of at minimum one of the said transmitter signal (S5), and
   d. and that the controller (CT) drives the minimum of one compensation transmitter (K) by way of said compensation signal (S3), that said receiver output signal (S0) of said receiver (D) contains no remaining components of the transmitter signal (S5) except for a control error and system noise.

or in the second version
   e. it possesses a minimum of one signal generator (G), capable of producing the minimum of compensation signal (S3), by which the minimum of one compensation transmitter (K) is controlled, which at minimum transmits into one receiver (D) and
   f. it possesses the minimum of one controller (CT) emitting the minimum of one transmitter signal (S5) which drives the minimum one transmitter (H), which also transmits in a superimposing manner into the at minimum one receiver (D), and
   g. that said controller (CT) generates the at minimum one of said transmitter signal (S5) out of a minimum of a receiver output signal (S0) of one of the said receivers (D) and at minimum one compensation transmitter signal (S3), and
   h. and that the controller (CT) drives a minimum one transmitter (H) by way of a minimum of one said transmitter signal (S5) in such a way that the receiver output signal (S0) of said receiver (D) contains no remaining components of the compensation transmitter signal (S3) except for a control error and system noise or
   i. that it is a combination of the first and second version and
   ii. that at minimum of said optical transmitters (H) it is able to transmit at minimum into a first transmission path (I1) which is only a partial component of the device, and
   iii. which terminates at minimum one object (O), which is not part of the device, located at the end of the first transmission path (I1), and able to transmit light into at minimum of a second transmission path (I2), which is only a partial component of the device, and which terminates at minimum one of the said receivers (D), which is part of the device, and
   iv. that at minimum one of these receivers (D), which is able to receive the transmitter signal (S5) modified by the transmission through the first transmission path (I1) and/or the second transmission path (I2) and/or the reflection by the object (O) and to transform the transmitter signal (S5) at minimum into one receiver output signal (S0) and
   v. that one of said controllers (CT), which is part of the device, outputs the minimum of one signal (S4), which may be used outside the device and
   vi. that this signal (S4) represents the measure of a minimum of one feature, at minimum of one first transmission path (I1) or one second transmission path, or representative reading at minimum for one property at minimum for one object (O) at the end of one of the said first transmission paths (I1) or at the beginning of said second transmission path (I2), and over an output signal (S4) at minimum, emitted upon request and vii. that this compensation transmitter (K) transmits into at minimum one third transmission path (I3), which is entirely a component of the device and viii. that at minimum one of the third transmission paths (I3) terminates at the minimum by one said receiver (D) and ix. that at minimum this receiver (D) is capable of picking up at minimum the signal in said compensation transmitter (K), superimposed with the signal at minimum by one transmitter (H)

If such a Halios system is to be installed into a single SMD housing, there are several challenges to be met, in reference to optics and workability.

This problem is not resolved by DE102010014462A1, as this document does not reveal the optics. A series of optical components and potential arranging of optical elements may be taken from the document DE102010028967A1, in reference to such Halios systems. In conjunction with the elaboration of the disclosure at hand, it was noticed that the backscattering of the light of the compensation transmitter (K) to the receiver (D), typically by a photodiode, and from there to the object (O), and from there again back into the receiver (D) results in a disturbance signal in the receiver (D). The problem made itself noticed as an environment-dependent basic coupling. This problem is not mentioned nor resolved in DE102010028967A1. The semitransparent mirror (e.g. FIG. 9, reference sign 192 of DE102010028967A1) listed there still results in a continued radition of light from the compensation transmitters, which then might be scattered towards the object. Also, typically an overloading of the receiver (D) occurs caused by the compensation transmitter (K). It was also noticed, that the known state of the art devices, despite all diligence, show a temperature dependency of the test reading, which could be explained and corrected within the framework of the invention, and could be ascribed to the problem of the differing dampening from the transmission path and compensation path.

A model of the state of the art housing, which addresses the problem of an environment-dependent basic coupling, is known from the published patent application DE102012210891A1.

Generally there are the transmitter (H) the object (O), each within the transmission paths and the receiver (D): The actual transmission path (I1 & I2, I3) and a parasitic transmission path.

The light of the transmitter (H) may be transmitted from the transmitter (H) to the object (O) first and from there it may be reflected to the photodiode, the receiver (D). In this way the light of the transmitter (H) should initially be sent from transmitter (H) to object (O), and from there reflected back to the photo diode, the receiver (D). The light of the transmitter (H) should not directly fall on to the photo diode (D). In reference to the light of the compensation transmitter (K) it is the opposite: It should fall directly on the photodiode (D), and if possible not be dispersed onto the object (O). Hereby a maximum of the transmitted energy should reach the object to be detected, and a maximum of the reflecting light of the object is to be captured by a receiver. For this, for example in the state of the art DE102012210891A1, a lens is proposed which is arranged coaxially to the center point of the transmitter or receiver. (FIG. 3 of DE102012210891A1). A problem of the technology disclosed by DE102012210891A1 is that the illumination of the space is significantly lower than that of the device which is part of the invention. The lenses (reference numbers 218 and 312 of DE102012210891A1) are lowered around a low rim relative to the top cover (reference numbers 219 and 319 of DE102012210891A1). It further limits the illumination. The necessary spatial illumination is achieved through a complex three-dimensional arrangement of several sensor modules in accordance with DE102012210891A1 (FIG. 6 of DE102012210891A1). The patent application DE102010027499A1 resolves this illumination problem similarly (FIG. 1 of DE102010027499A1) by use of multiple modules corresponding to DE102010027499A1.

The described illumination problem is similarly resolved in the European patent application EP2549652A2. However the three-dimensional assembly is not carried out on module level but on component level. This complex three-dimensional assembly of transmitters and receivers already achieves an improved spatial illumination in comparison to DE102012210891A1 (FIGS. 5a and 5b of EP2549652A2). Thereby the lenses are always arranged coaxially to the transmitters and receivers (FIGS. 2 and 4 of EP2549652A2) as disclosed in DE102012210891A1. Here as well a u-shaped housing (reference number 130 of EP2549652A2) causes shadowing on the receiver (reference number 200 of EP2549652A2) whose receiver beams are limited through the trough walls.

In the text WO20131134456A1 an assembly is disclosed in which a HALIOS system is taking advantage of glass fibers within a PCB. The transmission diode (reference number 102 of WO20131134456A1) is marked in FIG. 1 of said patent application in conjunction with a lens, which is in turn arranged centrically. Said shadowing problem is caused by the walls of the mounting hole. (reference number 109 of WO20131134456A1). Therefore the illumination is also not optimal here.

This problem is solved significantly better in patent application DE102006020570A1. It is not, however, the objective of the system to supervise the entire open space above the system, but only a limited space immediately above the sensor system. As previously, the central lens (reference numbers 21 and 53 of DE102006020570A1) is arranged centrically relative to the receiver (reference number E of DE102006020570A1). A symmetrical illumination is not possible in this solution. The transmitters do not feature lenses.

A significant problem in the integration of such HALIOS systems in one housing is the suppression of parasitic couplings. The miniaturization accentuates the problem, identified as cross-talk in the following paragraphs. Especially the exposure of the measuring object to scattered light from the compensation transmitter (K) changes hereby the basic coupling dependent on the usage situation which was already described in the European patent application EP2418512A1.

And finally, in the state of the art the problem of temperature dependency is neither recognized nor does it give solutions for it. There will be responses to this problem and additional writings from the state of the art in the following description of the invention for the distinction of this disclosure towards the state of the art. It is stated in advance, that none of the state of the art publications, mentioned previously and in following, address the problem of the situation-dependent basic coupling of scattered light from the compensation transmitter.

SUMMARY

It is the objective of the disclosure to enable the integration of the different optical sensors and sensor components as part of a HALIOS system in a single SMD housing and to reduce the cross-talk and to enable the optimal illumination, sensitivity, and temperature dependency of the system without requiring a complex three-dimensional arrangement of transmitters and receivers. Hereby for one, the light of the compensation transmitter within the system is dissipated, so that it does not lead to a situation-dependent basic coupling, like in the state of the art systems, for the other, that the light paths within the systems are perfectly coordinated with each other.

These functions fulfill the objective with a device in accordance with claim 1 and the following claims.

DESCRIPTION

The construction and the operation of the device is described according to the principles of the disclosure are described using the accompanying Figures.

Within the framework of the disclosure at hand, the analyzing and resolving of the problem of temperature dependency in the test reading of Halios systems. Initially it was noticed, that is was necessary for the compensation transmitter (K) as well as the transmitter (S) to be operated at approximately the same electric optical working point, and within it to approximately exhibit the same nonlinear elements in reference to the current-light-curve. An electro-optic operating point is run by an electrical operating performance and/or an electrical operating current and/or an electrical operating voltage as the first parameter, which are caused by transmitter (H, 2, 3, 4) or compensation transmitter (K, 9), and the optical effect on the receiver (D) as the second parameter which are generated by a transmitter (H2, 3, 4) or compensation transmitter (K, 9), operated in this way.

This is not known from any of the previously and in following named state of the art publications. To reach this goal it is initially useful, if the transmitter (H) and compensation transmitter (K) are of the same type, preferably from adjacent positions of an LED wafer, to maximize the matching between these LEDs.

Since the compensation transmitter (K), here the compensation end diode (9), is typically found closer to the receiver (D) or the photo diode (10), it usually radiates significantly brighter into the receiver (D) than the transmitter (H) whose light can only reach the receiver (D) weakened, passing through the transmission paths (I1, I2), and through reflection from the object (O) and/or transmission through the object (O). Hereby the setup of the state of the art for the compensation transmitter (K) and the transmitter (H) forces a different electro-optical operating point in the form of differing electrical energization and/or differing lighting strength of the receiver (D), which ultimately leads to a temperature-dependent test reading.

Figure 1:
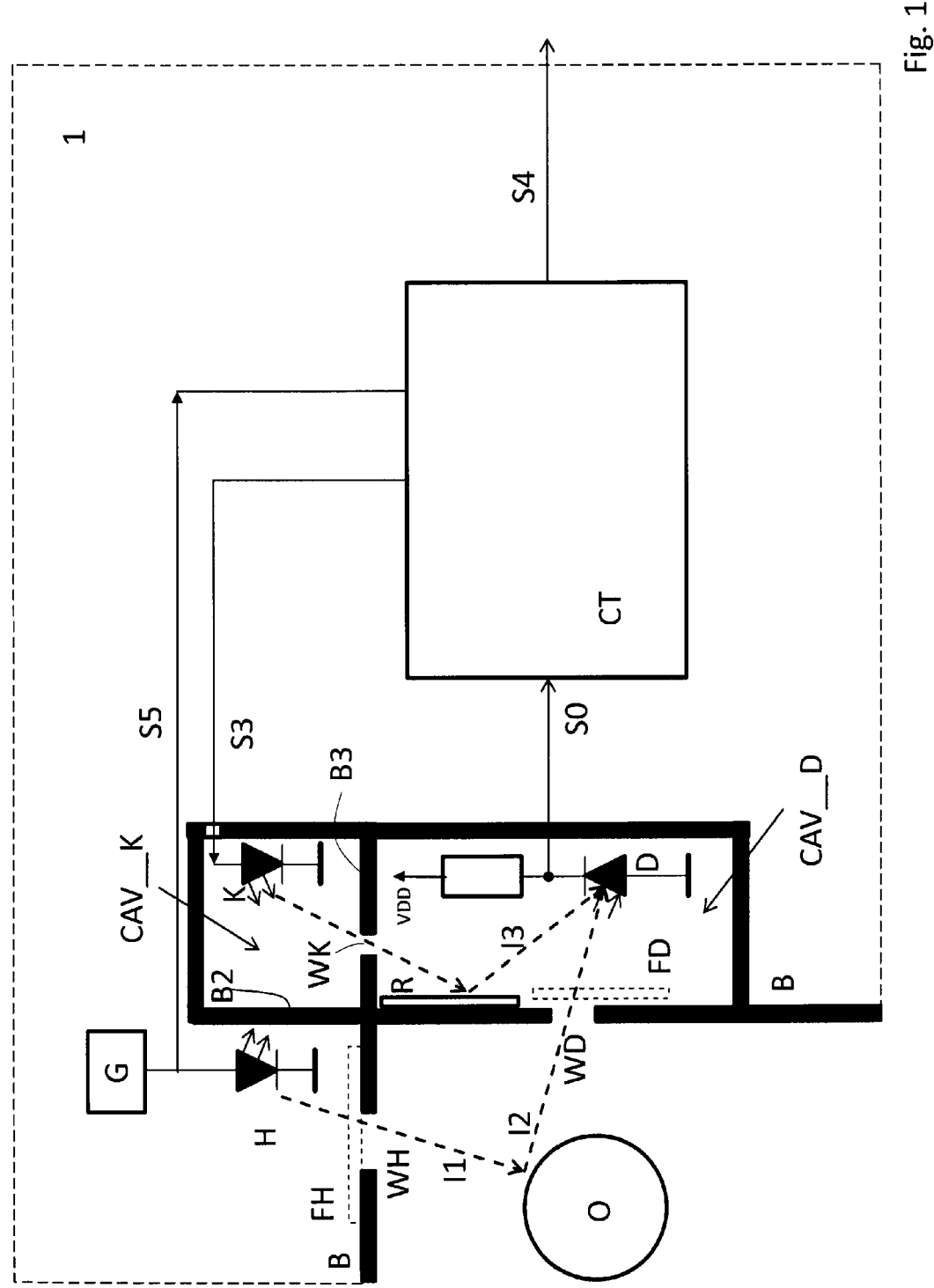
FIG. 1 is a diagram of an exemplary device for measuring an optical transmission path.

FIG. 1 shows an exemplary measurement device. The receiver (D) is thereby symbolized by a photo diode with pre-resistor between mass and supply voltage VDD.

There is an optical barrier (B) marked in FIG. 1, which prevents, that the light of the compensation transmitter (K) and the compensation diode (K) from falling directly on to the object (O). The function of that barrier, known from EP2418512A1 is as follows: To ensure that the transmitter (H) is able to illuminate the object (O) via the first transmission path (I1), the optical barrier (B) must show an optical transmission path window (WH), which must be transparent for the radiation of the transmitter (H). The wave length of the transmitter (H) is referred to as transmitter wave length. The barrier (B) is to feature a second optical receiver path window (WD) from the analog ground in the area of the second transmission path (I2), which is transparent for the detectable radiations, and especially for the wave length of the detectable radiation. The wave length of the radiations to be detected is typically of the same wave length as the radiation from the transmitter (H), and therefore the transmitter wave length. But this does not necessarily have to be the case. It is for example conceivable, that the object (O) fluoresces under irradiation by the transmitter (H), and that only this fluorescence is to be measured. In this case the receiver path window (WD) is typically chosen in such a way, that it would preferably only be transparent for the wave length of the fluorescent radiation, meaning the fluorescence wave length.

The light of the compensation transmitter (K) is not to escape outward. Therefore it is useful that the receiver path window (WD) and the transmitter path window (WH) are not transparent for the wave length of the light of the compensation transmitter (K), and the compensation transmitter wave length, and it is useful that they absorb light of that wave length. Also, these windows should not to reflect the light of the compensation transmitter (K), so that the light is eliminated from the system, and does not remain inside the system due to multiple reflections, resulting in signal distortions. The receiver path window (WD) in front of the detector must be transparent for the wave length of the radiation to be detected, typically the transmitter wave length and/or the fluorescence wave length. It must reliably suppress radiation of the compensation transmitter wave length. In this case, the compensation transmitter (K) appropriately transmits on a different wave length than the transmitter (H). The compensation transmitter wave length should therefore differ from the transmitter wave length. Preferably the windows are equipped with filters, specifically transmission path filters (FH) for the transmission path and the receiver path filter (FD) for the receiver path, to be able to exemplary fulfill the transmissivity reflectivity.

For this purpose it is practical to define the terms. In following transmissivity means the portion of light not damped at a center wave length of the light beam intensity (energy) when passing a filter or a set up component in comparison to the light beam intensity (energy) of the incident light before the passage through the object. For example, in the case of a damping by 50%, the transmissivity is 50%.

In following reflectivity means that a portion of light not damped at a center wave length of the light beam intensity (energy) when reflected at a filter or a set up component in comparison to the light beam intensity (energy) of the incident light before the reflection at the object. For example, in the case of a damping by 50% the reflectivity is 50%.

In following absorption factor means the degree of light beam intensity (energy) reduction of a light beam at a defined center wave length during reflection at a filter or a package component and parallel transmission through said filter and said package component in comparison to the light beam intensity (energy) of the incident light beam before the reflection at the object. This energy remains in the object and is not reflected and transmitted. For example, with a transmissivity of 25% and a reflectivity of 24% the absorption factor is 50%.

In regards to the inventive device the transmission path filter (FH) is preferably for the wave length of the transmitter (H), thereby for the transmitter wave length, a transmissivity of ideally 100%, or of at minimum 50%, or at minimum 75%, or at minimum 88%, or at minimum 95%, or at minimum 98%, or at minimum 99%.

The transmission path filter (FH) is to preferably have a reflectivity of ideally 0%, or at maximum 50%, or at maximum 25%, or at maximum 12%, or at maximum 5%, or at maximum 2%, or at maximum 1% of the transmitter's (H) wave length.

At the wave length of the light from the compensation transmitter (K), the compensation transmitter wave length, the transmission path filter (FH) is to preferably have in parallel a transmissivity of ideally 0%, or at maximum 50%, or at maximum 25%, or at maximum 12%, or at maximum 5%, or at maximum 2%, or at maximum 1%.

At the wave length of the light from the compensation transmitter (K), the compensation transmitter wave length, the transmission path filter (FH) is to preferably have in parallel an absorption factor of ideally 100%, or at minimum 25%, or at minimum 50%, or at minimum 75%, or at minimum 88%, or at minimum 95%, or at minimum 98%, or at minimum 99%.

At the wave length of the light from the transmitter (H), the transmitter wave length, or at the wave length of the radiation to be detected the receiver path filter (FD) is to preferably have a transmissivity of ideally 100%, or at minimum 50%, or at minimum 75%, or at minimum 88%, or at minimum 95%, or at minimum 98% or at minimum 99%.

At the wave length of the light from the compensation transmitter (K), the compensation transmitter wave length, the receiver path filter (FD) is to preferably have in parallel a transmissivity of ideally 0%, or at maximum 50%, or at maximum 25%, or at maximum 12%, or at maximum 5%, or at maximum 2%, or at maximum 1%.

At the wave length of the light from the compensation transmitter (K), the compensation transmitter wave length, the receiver path filter (FD) is to preferably have in parallel an absorption factor of ideally 100%, or at minimum 25%, or at minimum 50%, or at minimum 75%, or at minimum 88%, or at minimum 95%, or at minimum 98%, or at minimum 99%.

In any case preference is to be given to a high absorption factor for the wave length of the compensation transmitter (K), and therefore the compensation transmitter wave length, rather than to an increased reflectivity.

In any case this enables the receiver (D) to receive the signal from the compensation transmitter (K), therefore the compensation transmitter diode (9), as well as the signal of the transmitter (H). The receiver (D) must therefore be sensitive to detect the compensation transmitter wave length and the wave length of the radiation, therefore typically the transmitter wave length and/or the fluorescence wave length. The usage of transmission path windows is already known from US20050184301A1 (e.g. FIG. 12, reference numbers 85 to 89 of the US20050184301A1). However their function is solely the selection of incoming light from a transmitter (e.g. FIG. 18, reference numbers 132-136 of US20050184301A1) after reflection by a measuring object (e.g. FIG. 18, reference number 146 of US20050184301A1). In the device conforming with the principles of the disclosure, it is necessary to ensure on one hand, that the light of the transmitter (H) can enter into the device conforming with the principles of the disclosure and thereby to the reach the receiver (D), and at the other hand that the light of the compensation transmitter (K) for one, cannot simultaneously escape from the system, for the other that it can be eliminated from the system as quickly as possible, with as few reflections within the system as possible.

If the light of the compensation transmitter (K) was to escape from the system, the result would be distorted and the base coupling, which is discussed extensively in the patent application EP2418512A1, would be dependent on the features of the object (O) to be measured in the transmission path consisting of the first transmission path (I1) and the second transmission path (I2).

Furthermore all materials within the device, including filters and optical elements, should be configured for other wave lengths than the following three cases, to have an absorption factor of ideally 100%, or of at minimum 25%, or at minimum 50%, or at minimum 75%, or at minimum 88%, or at minimum 95%, or at minimum 98%, or at minimum 99%. The spectral ranges with low absorption factor refer to: first, the wave length of the transmitter (H), therefore the transmitter wave length, second, the wave length of the compensation transmitter (K), therefore the compensation transmitter wave length, and third, the wave length of the radiation to be detected, therefore for example the fluorescence wave length and/or the wave length of the transmitter (H).

This applies particularly to wave lengths, which lead to a signal in the receiver (D) during exposure.

The material of the housing walls is to exhibit an absorption factor of ideally 100%, or at minimum 25%, or at minimum 50%, or at minimum 75%, or at minimum 88%, or at minimum 95%, or at minimum 98%, or at minimum 99% at all wave lengths. Evidently this does not apply for optically transparent parts like lenses, etc.

This specifically applies to all wave lengths, which create a signal during irradiation of the receiver (D).

To prevent the transmitter (H) from directly radiating into the receiver (D) a second barrier (B2) as for example known from EP2418512A1 is useful. It prevents this or at least prolongs the optical path or otherwise buffers the unwanted direct signal.

To ensure that the compensation transmitter (K) can solely transmit into the receiver (D) by way of reflection to a reflector (R), the compensation transmitter (K) is stored in a compensation transmitter cavity (CAV_K), and therefore surrounded by a third optical barrier (B3). It features a compensation path window (WK), by which the compensation transmitter (K) is able to transmit into the receiver (D), located in its own receiver cavity (CAV_D), through the compensation path window (WK) via a reflector (R). The compensation path window (WK) simultaneously fulfills the function of a shield, which prevents the radiation of light from the compensation transmitter (K) into other optical pathways, which might for instance terminate on the object (O). This is of special importance, if the wave length selectivity of the previously discussed filters (FD, FH) is not sufficient.

The compensation path window (WK) does not solely have the purpose to minimize flare light within the system, but also to minimize the light transferred from the compensation transmitter (K), as far that its intensity in a typical electro-optic operating point approximately aligns, using the same electrical energy supply as that of the transmitter (H), thru the optical transmission paths (I1, I2) and the object (O) to the receiver (D). Various dimensioning strategies for the compensation path windows (WK) may be considered. Initially it may be considered to size the compensation path window (WK) in such a way, that for a common object (O), for example a hand, at a commonly used spacing, e.g. 25 cm, the electrical operating point of the compensation transmitter (K) and transmitter (H) match. If the object (O) is moved farther away, the intensity of the radiation of the transmitter (H) is increased by way of preferred control algorithm, and simultaneously the intensity of the compensation transmitter (K) is decreased. In a preferred design of the system this is done to minimize the temperature coefficient of the test reading of the overall system. For this purpose the preferred control parameters are placed into a table, which define by which measure the intensity of the transmitter (H) is to be increased, if the intensity of the transmission intensity of the compensation transmitter (K) is to be decreased, and vice versa.

Though a barrier is already known (FIG. 2 or FIG. 3, reference number 40 of EP2418512A1), the function of such a third optical barrier (B3) in addition to that in the disclosure of EP2418512A1, is not disclosed in EP2418512A1. Such an additional third barrier (B3) can however be obtained from DE102010028967A1 (FIG. 14, reference number 264 of DE102010028967A1). However, the function as a blind, as well as particularly for the function of adjusting of the electric optical working point of the compensation transmitter (K) is not explicitly disclosed there.

Figure 2:
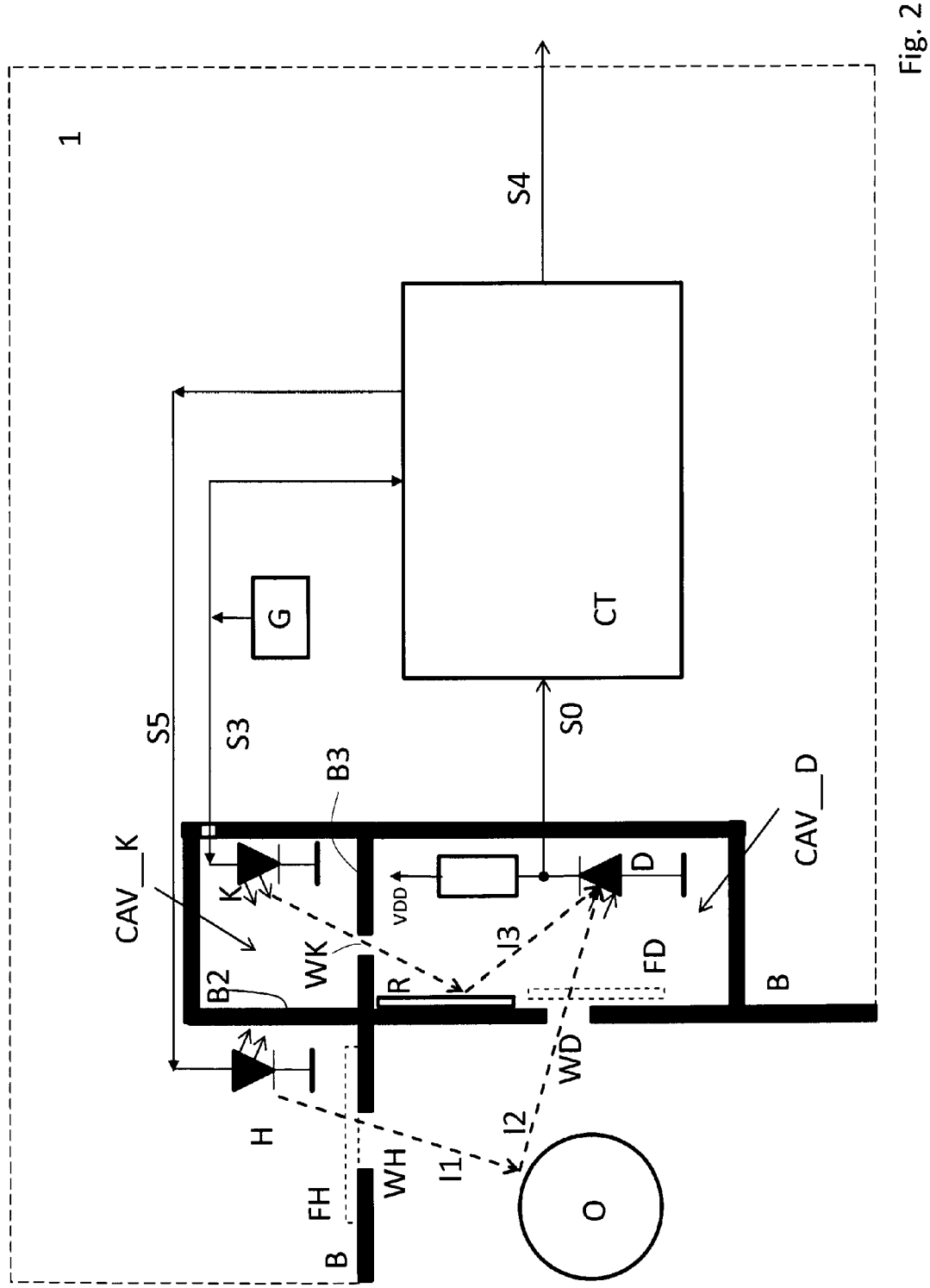
FIG. 2 is a diagram of an exemplary device for measuring an optical transmission path.

FIG. 2 shows the exemplary measurement device in accordance with FIG. 1, whereby now in contrast to FIG. 1 the transmitter (H) is controlled rather than the compensation transmitter (K).

Figure 3:
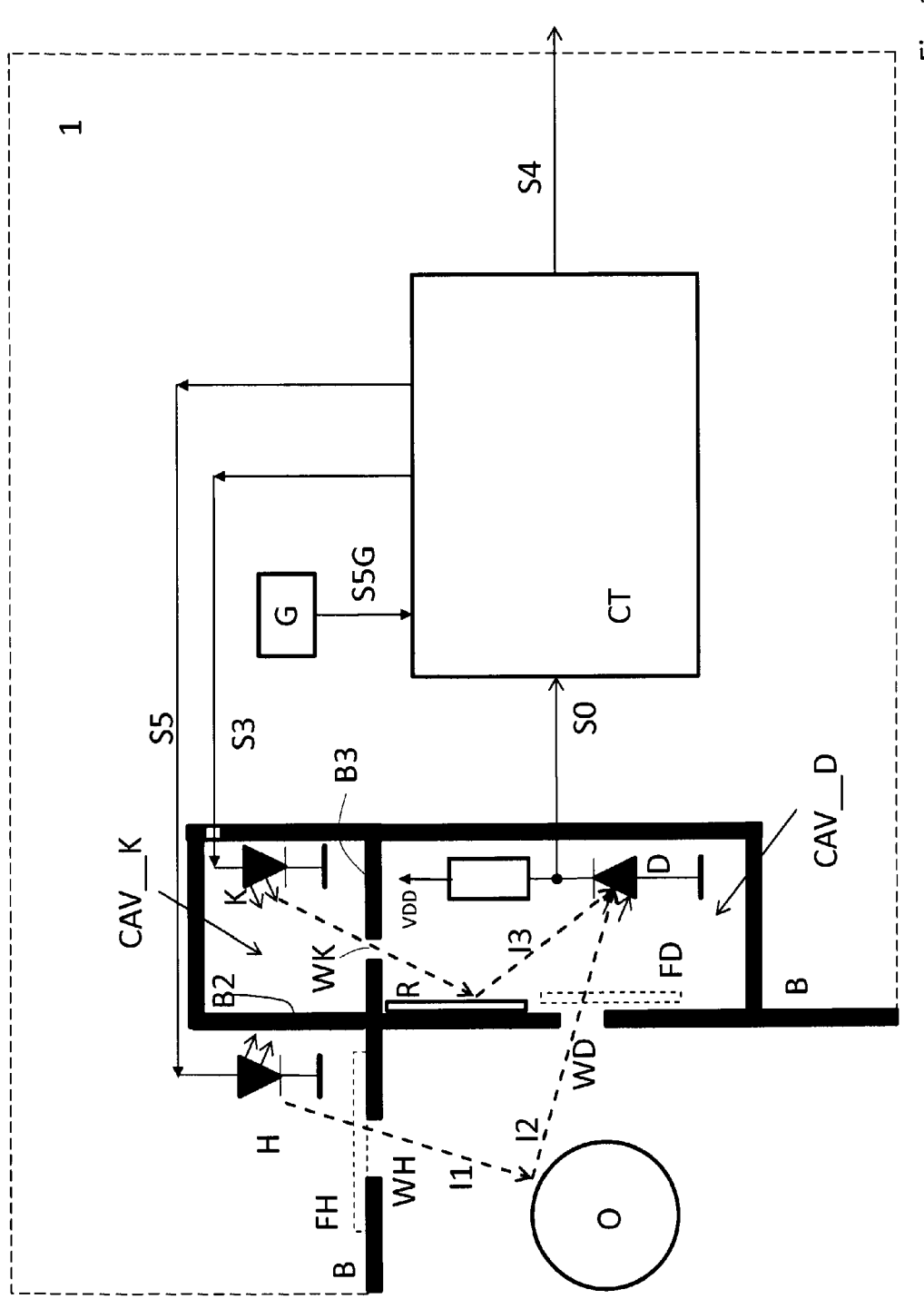
FIG. 3 is a diagram of an exemplary device for measuring an optical transmission path.

FIG. 3 shows the exemplary measurement device in accordance with FIGS. 1 and 2, whereby in contrast to the systems in FIGS. 1 and 2 the controller (CT) now creates the signal from the now separate generator signal (S5G) and the compensation signal (S3). This configuration is especially beneficial, if the temperature dependency is to be minimized through the minimizing of the difference between the electric optical working points of compensation transmitter (K) and transmitter (H).

Figure 4:
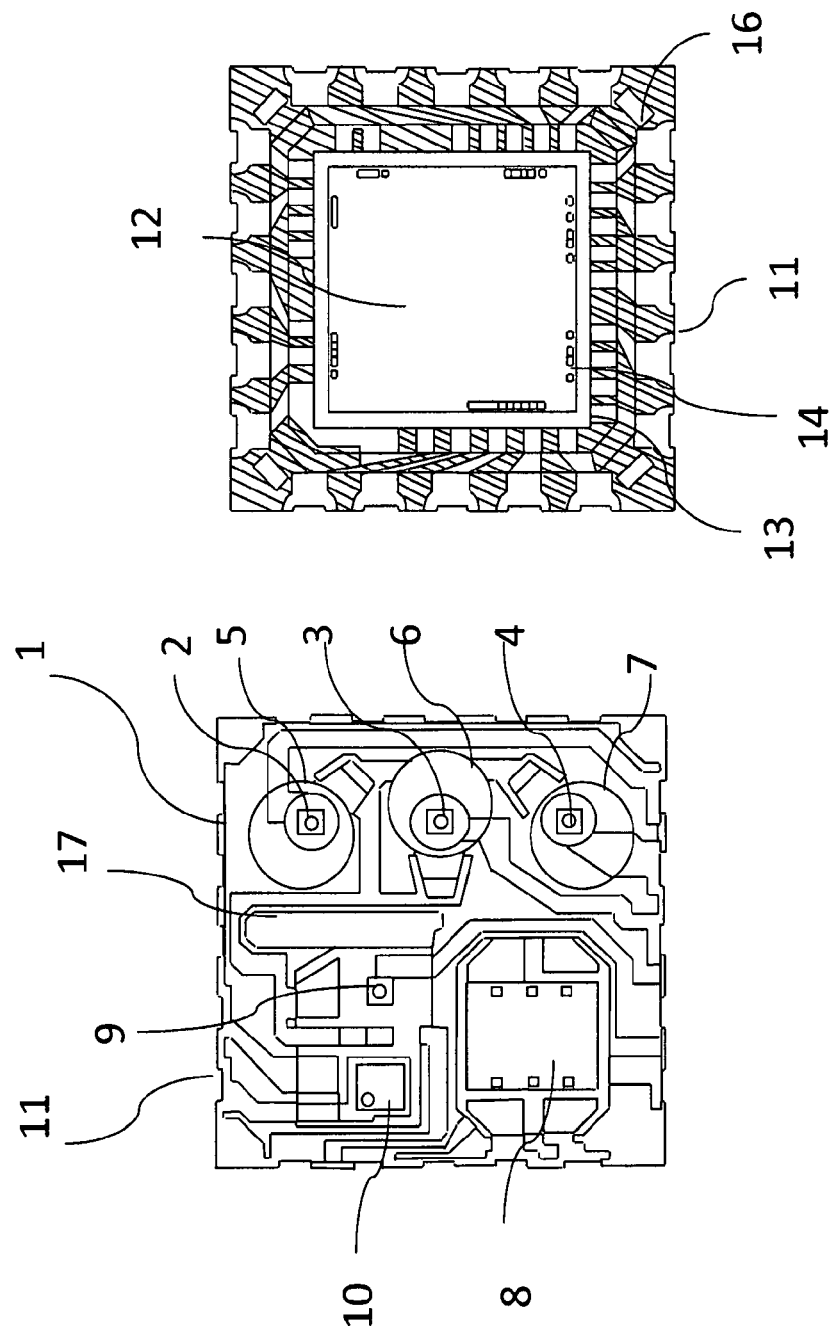
FIG. 4 is a top view of the exemplary device according to FIG. 1.

FIG. 4 shows the exemplary measurement device from an exemplary top view.

In the exemplary device (1) there are three LEDs (2, 3, 4) used as transmitters (H) and a photo diode (9) used as a receiver (D). Of course a different quantity of receivers (D) and a different quantity of transmitters (H) might be chosen. The controller (CT) and potentially also the generator (G) may potentially have to be adjusted. The photodiode (9) receives the light reverberated by the object (O) from transmitters (H) from the LEDs (2, 3, 4). The object (O) is not shown in FIG. 4, and may be understood to be located above the plane of projection in the direction of the observer. Furthermore a preamplifier (8) is part of the device (1). The compensation transmitter K (9) is part of the device (1) as well. All elements (2, 3, 4, 10, 9, 8) are mounted on the upper side of a common lead frame. The electrical connection is made through bonding, preferably by a gold wire bond. In addition an edge (17) is shown, which as the second barrier (B2), optically separates the transmitter diodes (2, 3, 4) from the photo diode (10), which acts as the receiver (D). Above each of the diodes (2, 3, 4) one lens (5, 6, 7) each is found, which forms the light beams.

The packaging technology used is that of a molded interconnection device. Hereby a three-dimensional shaped lead frame is spray-molded with a mold compound. The advantage of such a molded interconnection device technology (MID technology) is the opportunity of a direct implementation of electrical circuits, which typically had to be manufactured in PCB or FPCB technology, whereby the implementation takes place without additional materials, but solely by use of a special lead frame structure.

An integrated analysis circuit (12) (IC) is placed on the underside of the MID lead frame, for the activation of the transmitters to drive the transmitters (2, 3, 4), to analyze the receiver (D), here the photo diode (10), the control of compensation transmitter (K), here the compensation transmitter diode (9), and the communication with the processor of the operating system (via S4), for example of a cell phone. The circuit (12) thereby typically contains a controller (CT). The contacts (e.g. 14) of this analysis circuit (12) are thereby connected with the contacts (e.g. 13) of the lead frame thru bonding. In the process the analysis circuit (12) is preferably located in a recess of the housing, so that the bond wires are covered after the pouring of the mold mass. However, due to the specific shape of the lead frame soldering is still possible on this side of the housing. In this example there are recesses (16) planned for handling during assembly, which will prevent scratching of contacts (11), if a suitable gripping device is utilized, using the recesses as clamping points.

As explained above, a significant problem to be solved is the suppression of the parasitic coupling between the transmitter diodes (2, 3, 4) and the receiver (D), here the photodiode (10). For this purpose the housing has an optical barrier (17), which increases a length of the optical path between the transmitters (2, 3, 4) and the receiver (D), here the photodiode (10), and thereby reduces the coupling across parasitic paths. Thereby, various shapes may be used to form the optical barrier (17). Particularly the barrier (17) may be provided with slightly beveled sides, to ensure that the entire housing can easily be removed from the from the injection mold.

Figure 5:
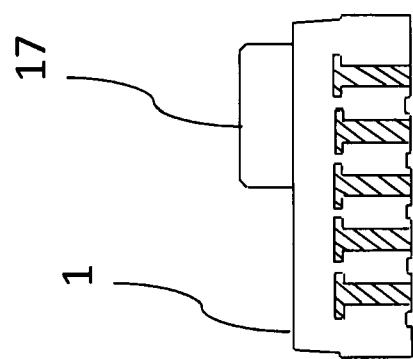
FIG. 5 illustrates an exemplary position of a barrier shown in the top view according to FIG. 4.
Figure 5:
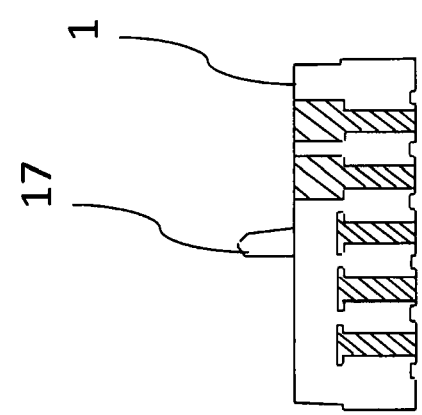

FIG. 5 shows once again the exemplary position and shape of the barrier (17) on the upper side of the housing from two different perspectives. Hereby the parasitic optical pathway is lengthened.

Figure 6:
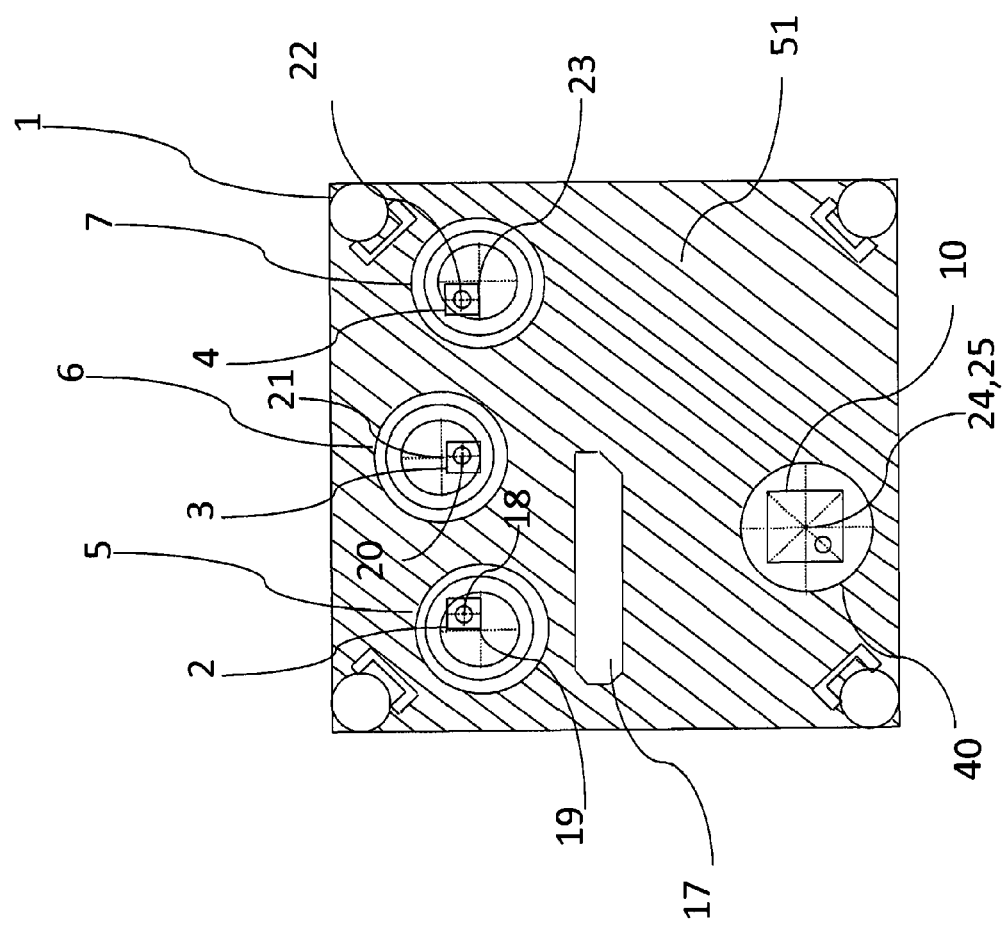
FIG. 6 illustrates exemplary locations of sensor center points to lens optical axes in the exemplary device according to FIG. 1.
Figure 9:
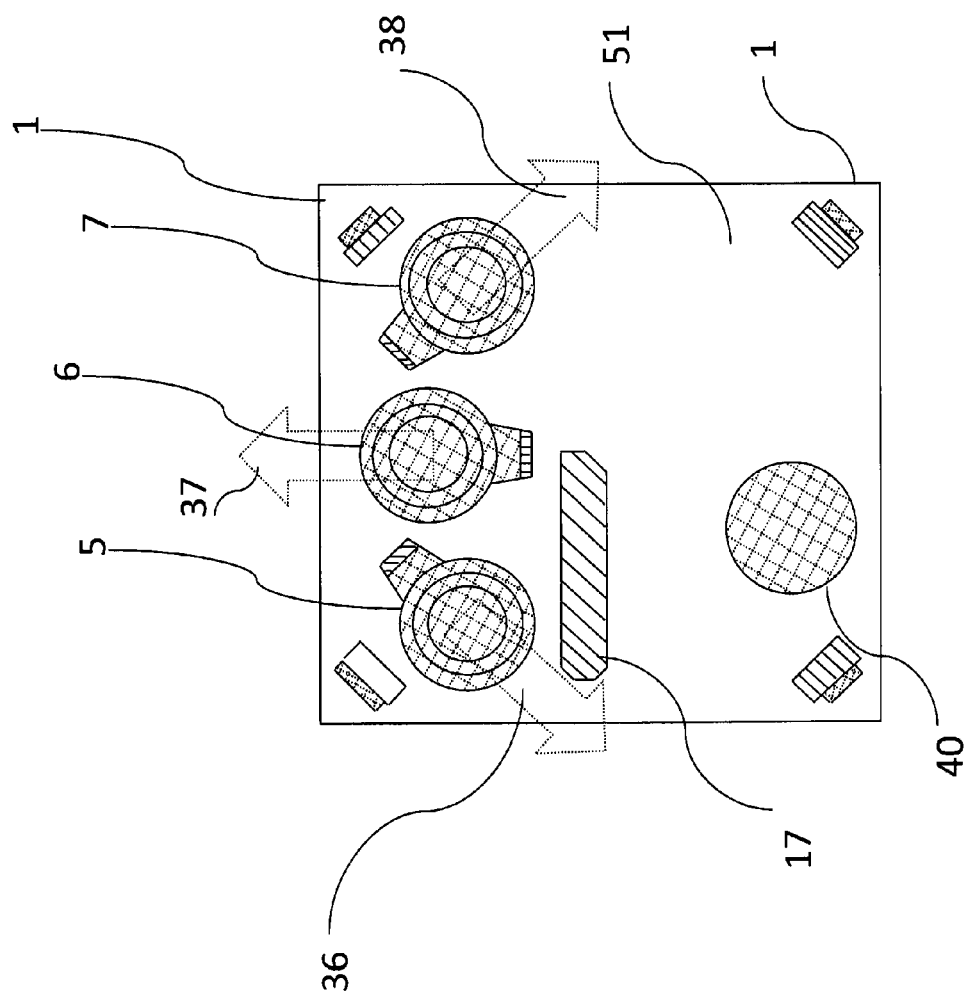
FIG. 9 illustrates exemplary orientations of emitted beams from transmitter diodes of the exemplary device according to FIG. 1.

The integrated micro lenses (5, 6, 7, 40) are placed above the transmitters (2, 3, 4) and the receiver (D), here the photodiode (10). This is shown in FIG. 6. The lenses (5, 6, 7, 40) are made of an optically transparent material. Regarding the transparency of these lenses, the implementations of the transmission and reception pathways, the preceding are to be referenced. On the transmitter side the lenses (5, 6, 7, 40) direct the emitted light beam (36, 37, 38 in FIG. 9) for an alignment and shape of the respective transmitters (2, 3, 4) in a preferred direction. Typically the focal points (18, 20, 22) of the transmitters (2, 3, 4) are offset in relationship to the respective optical axis of the corresponding lens (5, 6, 7). Depending on the value and direction of the offset of the corresponding lens (5, 6, 7), the direction of the transmitter beam lobe (36, 37, 38) of the corresponding transmitter diodes (2, 3, 4) changes. The size, form, and focal length of the corresponding lens (5, 6, 7) determine the form of the corresponding beam (36, 37, 38). Such lenses are for example known from US20050184301A1. The lenses (5, 6, 7, 40) do not need to have cylindrical symmetry. The lenses (5, 6, 7, 40) may be of different shapes. For example, they may be elliptical. Such lenses may have more than two focal lengths. The lenses may be manufactured by injection molding of transparent plastic materials. The transparency hereby refers to the wave length of radiation used for transmission and reception. In a similar way lenses (40) may be used to shape a receiver reception lobe on the receiver side. Also, here the center points (24) of the receivers, here the photo diodes (10), may be offset towards the optical axis (25) of the corresponding lenses (40), which is analog to the method of the transmitter beam lobe as described above. However, in the example of FIG. 6 the center point (24) and the center of the optical axis (25) are located on top of each other. As annotated, this does not necessarily have to be the case, depending on the application. It is especially beneficial if the receiver reception lobe/s is/are shaped in such a way, that the coverage ratio between the receiver reception lobes and the transmitter beam lobes is maximized in the relevant area above the sensor. Hereby the sensitivity of the system is maximized, which may improve performance, for example, for motion detection.

If the system, for example, is to be used for gesture recognition, it is useful for the transmitter beam lobes (36, 37, 38) to be oriented in different directions, for example with three transmitter beam lobes, each rotating by 120° around the axis, turned in perpendicular direction to the top side. In this case it is indeed useful, if the transmitter beam lobes overlap a little bit, but such overlap should preferably not exceed 60°. A transmitter beam lobe should therefore not be wider than 240°. The receiver reception lobe should cover the entire relevant area.

Particularly, it may be advantageous, if the relevant lens (40) of the corresponding receiver (D) (photodiode (10)) is only transparent for wave lengths used by the transmitter diodes (2, 3, 4). Beyond that, the wave lengths of the transmitter diodes (2, 3, 4) need not to be identical. Colors or wave lengths which are intentionally very different may be chosen for various transmitter diodes (2, 3, 4). Hereby it is possible to produce a miniaturized color sensor. For example, the receiver (D), here the photodiode (10), may be sensitive to visible light of all colors and infrared light, and the transmitters (2, 3, 4) consisting of three LEDs in the colors red (2), blue (3) and green (4). An infrared LED may in this case be used as the compensation transmitter (D, 9).

Figure 7:
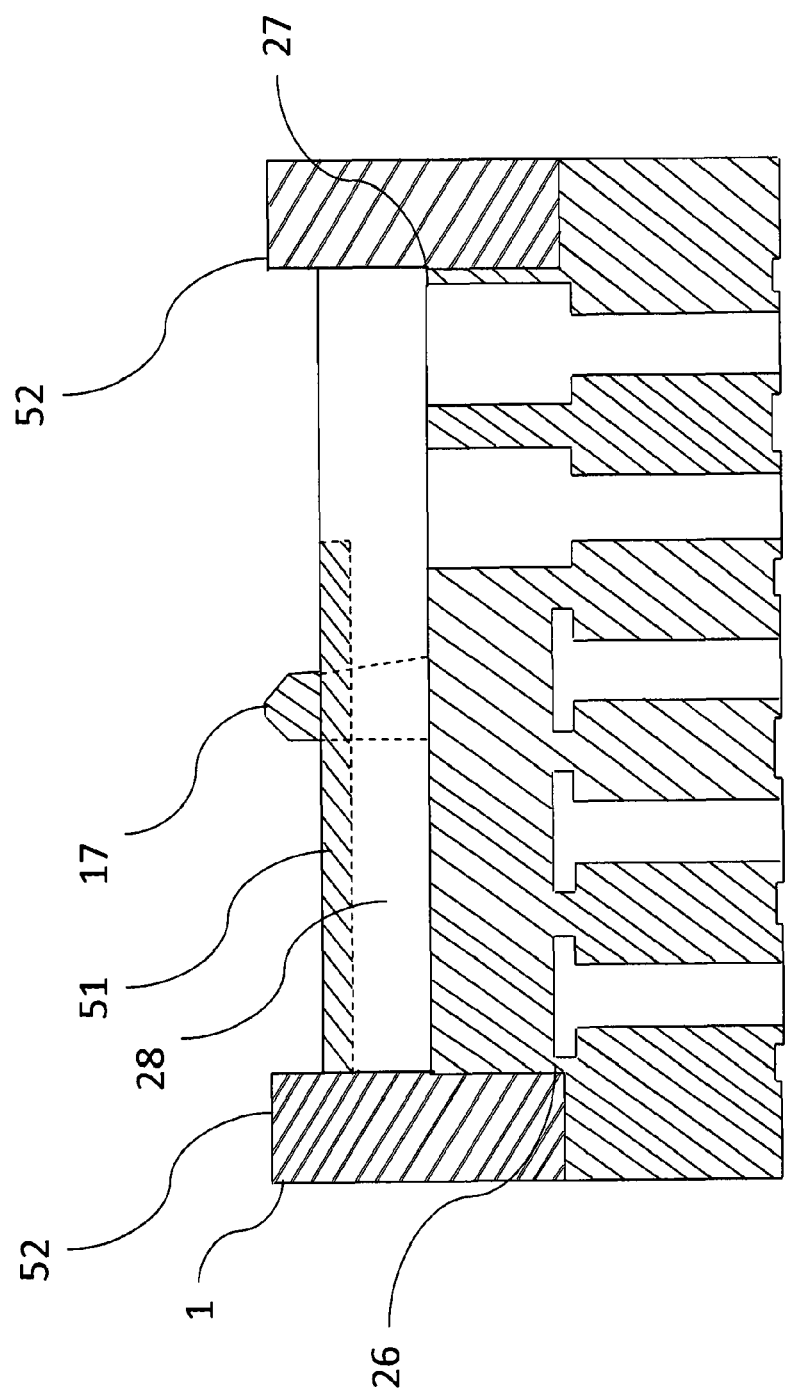
FIG. 7 illustrates a cross section of the exemplary device according to FIG. 1.

FIG. 7 shows a transverse section of the exemplary measurement device. In the case of the exemplary measurement device the lead frame is run in two layers (27, 26). Hereby the components are workable at different heights.

A wall (52) surrounds the cavities in which the components (2, 3, 4, 8, 9, 10, 12) are inserted. On the side of the transmitters (2, 3, 4, 9) and receiver (D), here the photodiode (10), the transmitter cavity as well as the and the compensation transmitter cavity (CAV_K) are typically filled with a transparent mold compound (28) with a high refraction index. In the area of the compensation transmitter (K), in this case the compensation diode (9), (28) is provided with an optical cover (51) which will be described later.

Figure 8:
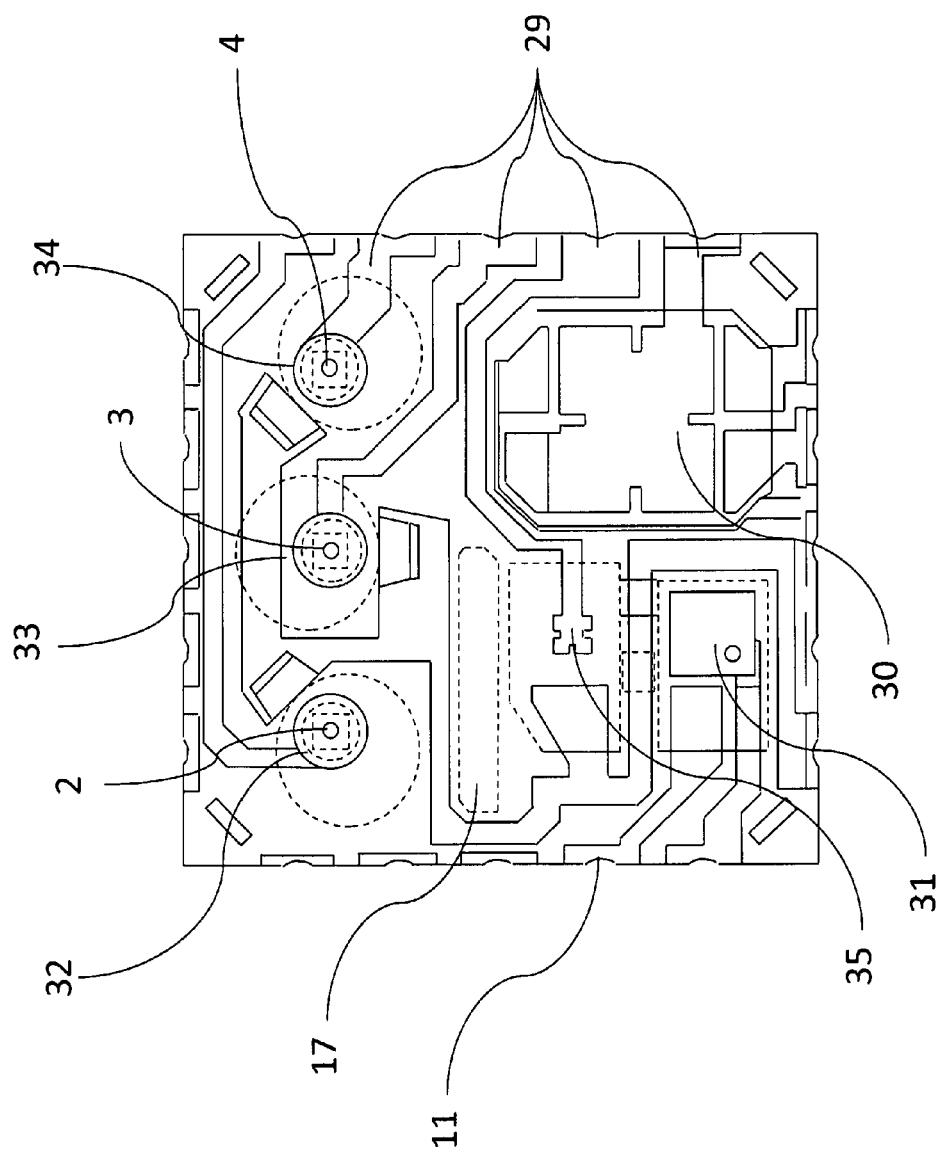
FIG. 8 illustrates a horizontal cut through of the exemplary device according to FIG. 1.

FIG. 8 shows a horizontal cross-section of the exemplary measurement device. Shown are various lines (29), which are part of the MID lead-frame. The transmitters (2, 3, 4) are attached to die-paddles (32, 33, 34), typically by gluing or also by soldering. The latter has advantages, if high thermal loads have to be removed. The position of barrier (17) is also shown for better orientation. A portion of the lines (29) lead to contacts (11) of the device. Internal connections are certainly possible. But, these require a support, which is detached after the mold process. The compensation transmitter, here the compensation diode (9) is attached to a suitable die paddle (35) as well. The receiver (D), here the photodiode (10), is also attached to the corresponding die paddle (31) and the pre-amplifier (8) to its die-paddle (30).

FIG. 9 shows once again the different exemplary orientations (36, 37, 38) of the transmitter beam lobes of the transmitter diodes (2, 3, 4) of the exemplary measurement device (1), as well as the corresponding lenses (5, 6, 7, 40). For better orientation the barrier (17) is once again shown.

Figure 10:
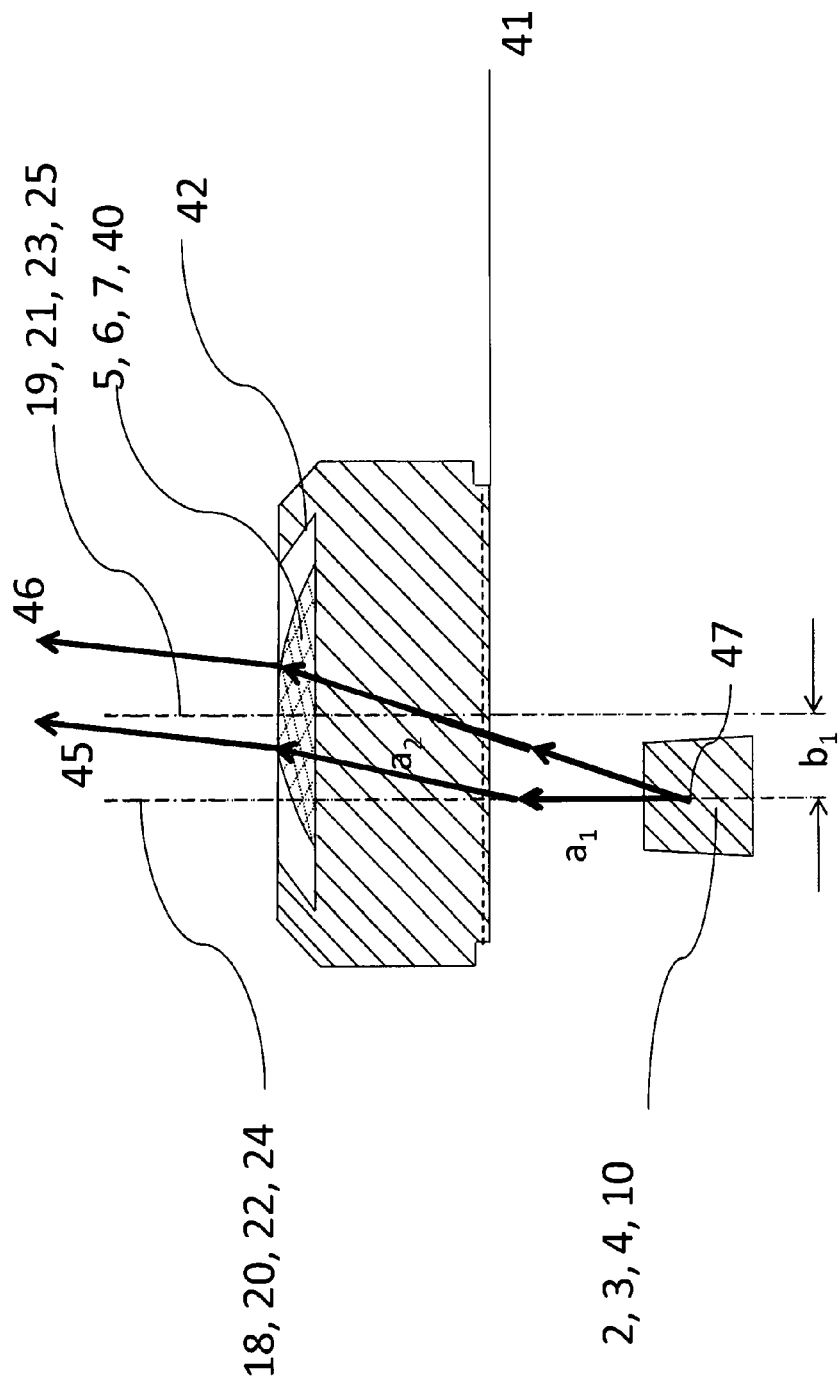
FIG. 10 illustrates an exemplary method for generating the exemplary emitted beams of FIG. 8.
Figure 11:
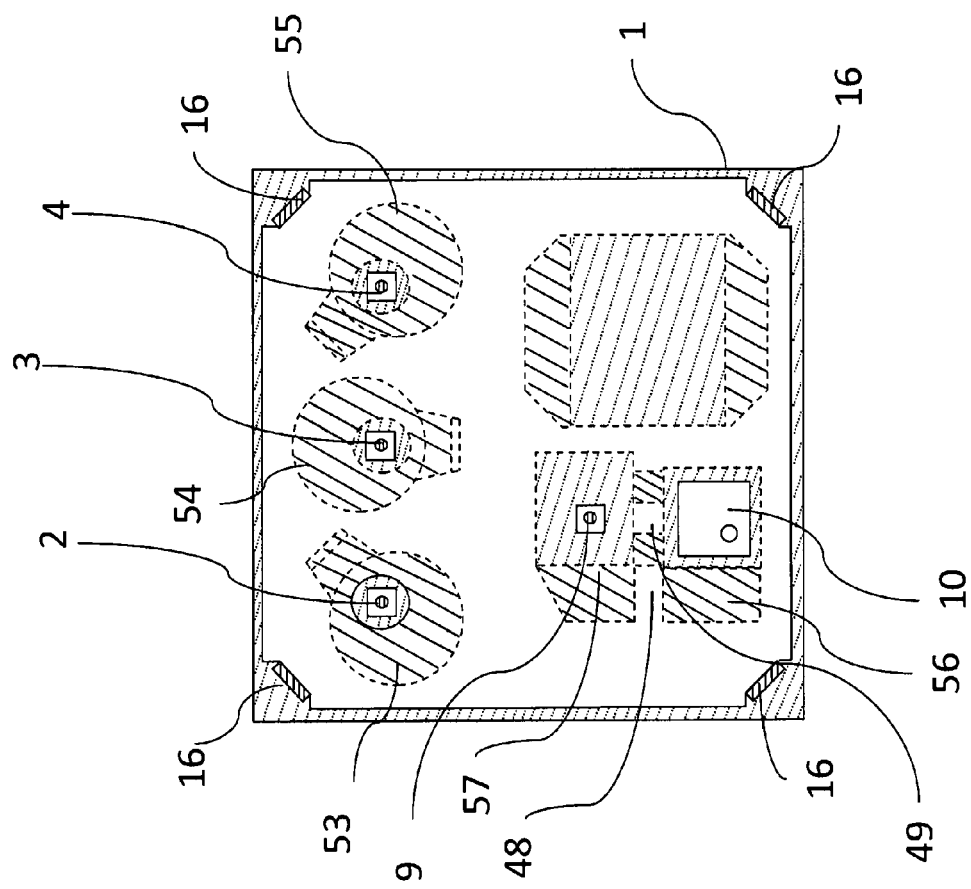
FIG. 11 illustrates a horizontal cross section of the exemplary device according to FIG. 1.

FIG. 10 depicts how the orientation of the receiver and transmitter beams is performed. To be able to orient the transmitter beam lobes differently, as shown in FIG. 11, it is useful for the transmitter diode to be moved out of its axis by 15°. For example the lens hereby has a diameter of 200 μm. The optical axis of the transmitters (18, 20, 22) or the receiver (24) respectively are at the height of the transmitters (1, 3, 4) or the receiver (D) (photodiode (10)) offset by a distance (b1) towards the optical axis (19, 21, 23, 25) of the corresponding lens. The light of the transmitter (2, 3, 4) enters the bottom side (41) of the lens, and is directed by the lens to the direction opposite to the transmitter.

FIG. 11 shows another horizontal cross-section the exemplary device (1). The recesses (16) for handling during assembly can be recognized. The transmitters (2, 3, 4) are located in separate transmitter cavities (53, 54, 55). These cavities cause an excellent optical decoupling. The compensation transmitter (K) also possesses its own compensation transmitter cavity (CAV_K), here cavity (57) for the compensation diode (9), which is separated by an optical barrier (48) from the corresponding receiver cavity (CAV_D), here the cavity (56) for the photodiode (10). In one area (49) said compensation path window (KW), this optical barrier (48) said third optical barrier (B3) is however modified in its height in such a way, that light is able to pass from the compensation transmitter (K), here the compensation diode (9), to the receiver (D), meaning the photodiode (10), as further described below. The cavities are optically open to the top side with the exception of the compensation transmitter cavity. The cavities appear from the corresponding receiver cavity (CAV_D), here cavity (57) of the compensation diode (9) optically open to the top.

The previously mentioned problem of the optimal optical coupling of the compensation transmitter (K), here the compensation diode (9), and the receiver (D), here the photodiode (10) remains. This coupling is discussed in FIGS. 12 and 13.

Figure 12:
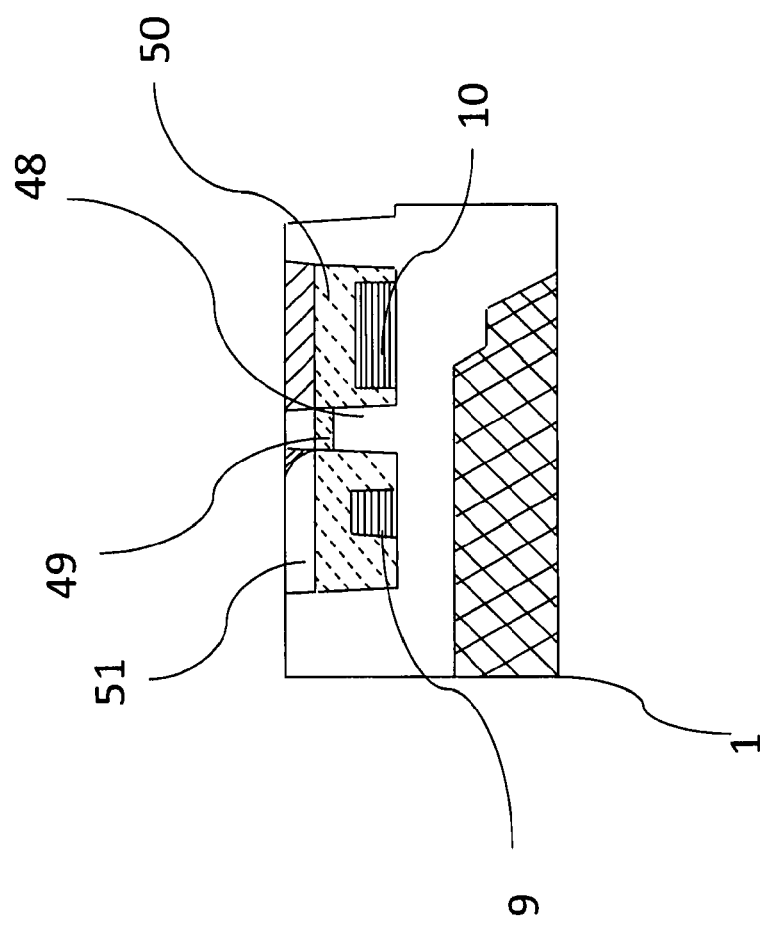
FIG. 12 illustrates a cross section through the compensation transmitter of the exemplary device according to FIG. 1.
Figure 13:
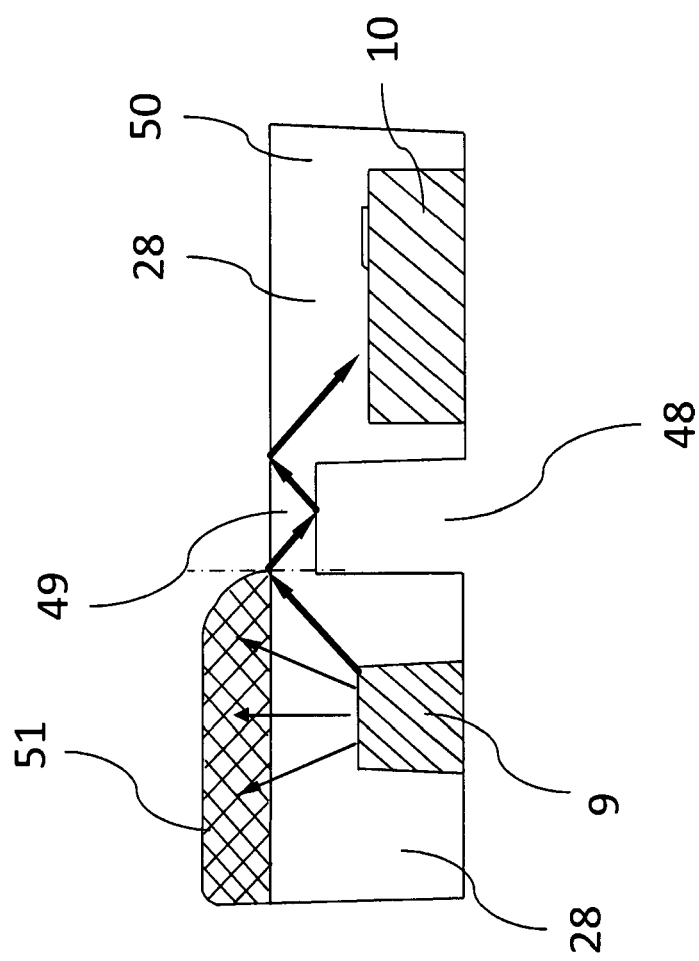
FIG. 13 illustrates an exemplary optical transmission path between a compensation transmitter and a receiver according in the exemplary device according to FIG. 1.

FIG. 12 shows a cross section of an exemplary device (1) through the compensation transmitter (K), here the compensation diode (9), and the receiver (D), here the photodiode (10). If possible, the receiver (D), here the photodiode (10), is to be particularly irradiated from its top side and not from its other side by the light of the compensation transmitter (K), here the compensation diode (9), because the light sensitive layer of the photodiode (10) is typically located on its surface. In the exemplary disclosure conforming device (1) this problem is resolved in such a way, that the compensation transmitter (K), here the compensation diode (9) transmits light toward the top.

Due to the different refraction indices between the transparent cover material (28) and air, a reflection of the light occurs back into the housing. This reflection occurs, if the incidence-angle of the light of the compensation transmitter (K), here the compensation diode (9), on the interface of the transparent cover material (28) is so flat that total reflection occurs. This reflected light therefore falls naturally, as desired, from the top onto the receiver (D), the photodiode (10) (see also FIG. 13). Light, which might pass directly from the compensation transmitter (K), here the compensation diode (9), to the receiver (D), here the photodiode (10), might be scattered by it, reach the object (O), and then be reflected by the object into the photo-detector (10), thereby disturbing the measurement signal (S4) and the controller (CT). This is prevented by said optical barrier (48), separating the receiver cavity (CAV_D), here cavity (56) of the photodiode (10), from the compensation transmitter cavity (CAV_K), here cavity (57) of the compensation diode (9). Only such light of the compensation transmitter (K), here compensation diode (9), which was reflected at the interface of the transparent cover material (28), may thereby fall on the receiver (D), here the photodiode (10). The opening (49), the compensation pass window (WK) above the optical barrier (48) is thereby designed in such a way, that the light transmitted from the compensation transmitter cavity (CAV_K), here cavity (57) to the receiver cavity (CAV_D), here cavity (56), preferably solely irradiates the receiver (D), here the photo diode (10). The opening (49) thereby effectively operates like an optical wave guide. Simultaneously the light beam of the compensation diode (9), thereby of the compensation transmitter (K), is thereby so muted, so that at least at one operating point, which is determined by the reflectivity and distance of a typical object (O), the electrification of the compensation diode (9), thereby of the compensation transmitter (K), and the electro-optical operating point at minimum of one of the transmitters (2, 3, 4), thereby of a transmitter (H) is the same. This means, that this transmitter (H, 2, 3, 4), and said compensation transmitter (K, 9), for example are supplied with the identical electric power, and thereby to produce an identical optical effect on the receiver (D).

The first exemplary possible setting of an unregulated transmitter (H) (FIG. 1) showing here, that this optical operating point is determined through the sensor system, by the smallest geometric gap of the most reflective still recognizable object, e.g. a white object. The compensation diode (9), thereby the compensation transmitter (K), is to be adjusted at a maximum, as the unregulated transmitter (2, 3, 4), thereby of transmitter (H), typically afterwards sends at maximum output.

It acts similarly during the second possible exemplary setting with an unregulated compensation transmitter (K) (FIG. 2). Here the electro-optical operating point of the compensation transmitter (K) is also preferably optimized for the minimal gap of the object (O) with the maximum reflectivity of the same.

In contrast to the two previously introduced cases however, there is a third setting option. According to the third exemplary setting, there is a typical object (O), for example an object (O) with a maximum reflectivity, at a typical distance, rather than at the minimal distance, measured and the compensation path window (WK), thereby the opening (49), dimensioned in such a way, that transmitter (2, 3, 4) as well as transmitter (H), as well as the compensation diode (9), and thereby the compensation transmitter (K), are located in the same electro-optical operating point. This means, that they are, for example, identically powered, and produce an identical optical effect to the receiver (D). In this case a reverse regulation of the transmitter (H) takes place, thus the transmitter diodes (2, 3, 4) and of the compensation transmitter (K), thus the compensation diode (9), whereby both transmitter signals, the compensation signal (S3) and the transmitter signal (S5) are created from a common internal regulating parameter (e.g. the advance signal S6 of EP2631674A1) of the controller (CT) assisted by a regulating function, which is typically based on a table.

The exemplary measurement device is a form of a Halios system for the measuring of an optical transmission path (I1, I2), in which the receiver (D, 10), and at minimum one compensation transmitter (K, 9), which are divided by a minimum of one optical barrier (B3, 48). To achieve a good matching of the electro-optical operating points, including their derivatives of the compensation transmitters (K, 9), and the minimum of one transmitter (K, 9, H, 2, 3, 4), it is practical for them to be of the same type. It is even more beneficial, if these (K, 9, H, 2, 3, 4) originated from the same production lot, from the same LED wafer, or even better from nearby places on an LED wafer. Since this is not possible if the compensation transmitter and the compensation diode happen to have different wave lengths, these should in this case be of different focal wave lengths, and at least feature a common electro-optical operating point in the system. The said optical barrier (B3, 48) hereby features a compensation pathway to transport the light of the compensation transmitter (K, 9) to the receiver (K), of the photodiode (10). This compensation pathway includes a compensation window (WK, 49) which muffles the light of said compensation transmitter (K, 9). The compensation pathway therefor muffles in its entirety the light of compensation transmitter (K), the compensation diode (9), prior to reaching the receiver (D) in the way, that the compensation transmitter (K, 9) and said transmitter (H, 2, 3, 4) at minimum one optical operating point, e.g. characterized by object reflectivity and object distance by the regulator (CT), operated in the same electro-optical operating point. An electro-optical operating point of a transmitter (H) or a compensation transmitter (K) is thereby characterized by two parameters: The first parameter is the light intensity which this transmitter creates at this electro-optical operating point, and thereby the size of the correlating receiver output signal. The second parameter is the size of the electrical signal which, for the production of exactly this radiation needs to be run through by the transmitter (H), or compensation transmitter (K), to exactly this transmitter (H) or compensation transmitter (K). The setting of the electro-optical operating point is done constructively, in one way by the size of the compensation path window, by the setting of the transparency of the mold compound in the area of the compensation path window, and by the setting of the reflectivity of the wave guide walls in the area of the compensation pathway. As described above, preferably the transmitting amplitude of the transmitter (H, 2, 3, 4) and the transmitting amplitude of the compensation transmitter (K, 9), with the minimum of one optical operating point, marked by the object distance and object reflectivity is reverse regulated by the regulator (CT). It may not imperative that this is the case in the entire permissible optical work area. Furthermore, the regulation of the typically to be expected range of distance and reflectivity area of typical objects (e.g. hands) should work reversed, because this way the deviations of the electro-optical operating points of the compensation transmitter (K), thus the compensation transmitter (9), and the transmitter (2, 3, 4, H) are the least. As already described previously, the regulation of the sending amplitude of the transmitter (H, 2, 3, 4) and the regulation of the sending amplitude of the compensation transmitter (K, 9) should take place in at minimum one work area, which is also identified by the object distance and object reflectivity, in such a way, that the temperature dependency of the test reading is minimized.

To prevent an indirect illumination of the object (O) by the compensation transmitter (K) (compensation diode (9)) it is required to eliminate light from the system (1) as quickly as possible, so that is not irradiated onto the receiver (D), here the photodiode (10), by total reflection.

For this the material of the housing of the disclosure conforming device (1) is preferably made of a material which absorbs all radiation in wave length ranges in which the light may escape from the housing, and in all wave length ranges in which the transmitters (2, 3, 4, 9) are transmitting.

All housing surfaces should therefore be preferably designed matte, so that the small amount of light, which will be scattered in spite of other measures, will be scattered diffusely. Of course this does not apply to optical surfaces like the upper interface layer of the transparent cover material (28), where total reflection should occur, and neither to the surfaces of the optical windows (WD, WH) or filters (FD, FH) or lenses (5, 6, 7, 40).

There is also an absorber (51) applied to the upper interface layer, which absorbs the radiation of the compensation transmitter diode (9), which is not mirrored by total reflection onto the receiver (D), here the photodiode (10), and would therefore escape from the housing of the disclosure conforming device (1) in an uncontrolled manner, absorbed, and therefore eliminated from the system.

The angles and shapes of the housing surfaces should thereby be designed in such a way, that multiple reflections preferably do not result in a light path on the receiver (D), here a photodiode (10).

An additional problem resulting from this is the reflection by the receiver (D), here the photodiode (10), itself. To enable penetration of the light into the receiver (D), here the silicone of the photodiode (10), has to be irradiated onto the receiver (D) at an angle as vertical as possible, because the speed of the light in the material of the receiver (D), and here in particular in the silicone of the photodiode, is significantly lower than in the wave guide. Therefore it is useful, but not absolutely imperative, to tilt the die paddle (31) of the receiver (D), here the photodiode (10) relative to the die paddle (35) of the compensation transmitter (K), here compensation diode (9). This tilting may lead to a reduced sensitivity of the receiver (D), here the photodiode (10), in regards to the reception of optical radiation, which is reflected back by the object (O). Therefore it continues to be useful to optimize the coupling into the receiver (D), here the photodiode (10) by way of a diagonal prism, as used for the transmitter (H), here the transmitter diodes (2, 3, 4).

Finally it must be noted that the receiver (D) and in particular in this case the photodiode (10), typically made of silicone, may be transparent for a portion of the radiation. In this case it may occur, that a reflection takes place on the underside of the receiver (D), here the photodiode (10). While this increases the efficiency of the receiver (D), here the photodiode (10), it ultimately leads to a distortion of the receiver output signal (S0). Therefore it is useful to attach the receiver (D), here the photodiode (10), to the die paddle (31) by way of glue, which is absorbent for wave lengths that might pass through the receiver (D), the photodiode (10).

The invention claimed is:

1. A device comprising:
   a housing defining a first cavity;
   a first transmitter transmitting a first transmitter signal along a first transmission path to a receiver based on a first input signal;
   a second transmitter transmitting a second transmitter signal along a second transmission path to the receiver based on a second input signal;
   the receiver disposed in the first cavity configured to generate a receiver output signal based at least in part on receiving the first and second transmitter signals as modified, respectively, by the first transmission path and the second transmission path;
   a controller configured to generate, based at least in part on the receiver output signal, one or both of the first and second input signals, such that substantially all of the first input signal is removed from the receiver output signal; wherein:
   the modification of the first transmitter signal along the first transmission path includes a value of a characteristic of the first transmission path to be measured;
   for at least one value of the characteristic to be measured, a respective strength of the first and second transmitter signals as received by the receiver, is substantially the same, and, simultaneously, an electrical operating point for each of the first and second transmitters, characterized by at least one of a respective electrical operating power, a respective electrical operating current and a respective electrical operating voltage, is substantially the same; and
   the second transmission path is fully enclosed within the device and includes a first optical barrier for blocking a direct irradiation of the receiver by the second transmitter, the optical barrier including a first window.

2. The device of claim 1, wherein the controller is further configured to generate a controller output signal including a representation of the value of the characteristic to be measured.

3. The device of claim 1, further comprising a generator, wherein:
   one of the first and second input signals is generated by the generator, and the other of the first and second inputs signals is generated by the controller, based in part on the one of the first and second input signals.

4. The device of claim 1, further comprising a generator, wherein:
   the controller generates, based in part on the generator signal, both of the first and second input signals.

5. The device of claim 1, wherein the first window is dimensioned, such that at a predetermined value of the characteristic to be measured, the electrical operating point for each of the first and second transmitters, characterized by at least one of a respective electrical operating power, a respective electrical operating current and a respective electrical operating voltage, is substantially the same.

6. The device of claim 1, wherein the first window includes a first filter.

7. The device of claim 1, wherein:
the optical barrier forms one wall of the first cavity;
the housing defines a second cavity adjacent to the first cavity, one side of the second cavity being formed by the first optical barrier; and
the second transmitter is disposed within the second cavity.

8. The device of claim 7, wherein one of the first cavity and the second cavity includes a reflector for directing the second transmitted signal toward the receiver.

9. The device of claim 1, further comprising a second barrier disposed such that a direct irradiation of the receiver by the first transmitter is substantially blocked.

10. The device of claim 9, wherein:
the first transmitter signal is received by the receiver from an object in a predefined area relative to the device; and
the characteristic to be measured includes a position of the object relative to the device.

11. The device of claim 10, wherein:
the first transmitter signal as received by the receiver includes a reflection of the first transmitted signal.

12. The device of claim 10, wherein:
the first transmitter signal as received by the receiver includes a fluoresced signal from the object.

13. The device of claim 10, wherein the second barrier includes a second window, permitting a direct irradiation of the object located in the predefined area by the first transmitter.

14. The device of claim 10, wherein the first cavity includes a third window permitting a direct irradiation of the receiver from the object in the predefined area.

15. The device of claim 1, wherein:
the first transmitter exhibits a first strength of the first transmitted signal for a first electrical operating condition, the first electrical operating condition including at least one of a first operating power, a first operating voltage and a first operating current;
the second transmitter exhibits a second strength of the second transmitted signal for a second electrical operating condition, the second electrical operating condition including at least one of a second operating power, a second operating voltage and a second operating current; and
the first strength differs by less than 10% from the second strength under a condition that the first electrical operating condition matches the second operating condition.

16. The device of claim 12, further comprising:
a second filter arranged such the first transmitter signal received by the receiver from the object in the predefined area passes through and is modified by the second filter; wherein:
a first wavelength of the first transmitted signal is different from a second wavelength of light of the second transmitted signal, and the second filter exhibits:
a transmissivity of at least 75% for a center wavelength of sensitivity for the receiver;
a reflectivity of at most 25% for the first wavelength of the first transmitted signal;
a transmissivity of at most 25% for the second wavelength of the second transmitted signal; and
an absorption factor of at least 75% for the second wavelength of the second transmitted signal.

17. The device of claim 1, further comprising:
a lens associated with one of the first transmitter and the receiver, wherein a focal point of the lens is displaced relative to an optical axis of the associated one of the first transmitter and the receiver.

18. The device of claim 1, further comprising:
a first die paddle associated with the receiver; and
a second die paddle associated with the second transmitter; wherein
the first die paddle is tilted toward the second die paddle.

19. The device of claim 1, further comprising:
a first die paddle associated with the receiver; wherein:
the receiver is attached with glue to the first die paddle, the glue being absorbent for wavelength ranges, which can pass the receiver, the receiver being formed of a photodiode.

20. The device of claim 1, comprising:
a second filter arranged such that the first transmitter signal received by the receiver from the object in the predefined area passes through and is modified by the second filter; wherein:
a first wavelength of the first transmitted signal is different from a center wavelength of sensitivity of the receiver, and the second filter exhibits:
a transmissivity of at least 75% for the center wavelength of sensitivity of the receiver;
a transmissivity of at most 25% for the first wavelength of the first transmitted signal; and
an absorption factor of at least 75% for the first wavelength of the first transmitted signal.

* * * * *